United States Patent [19]

Rhodes

[11] Patent Number: 4,854,809
[45] Date of Patent: Aug. 8, 1989

[54] HAY BALE ELEVATOR APPARATUS

[76] Inventor: Jim L. Rhodes, RR #5, Albia, Iowa 52531

[21] Appl. No.: 189,794

[22] Filed: May 3, 1988

[51] Int. Cl.$^4$ .............................................. B66C 1/10
[52] U.S. Cl. ..................................... 414/685; 294/61;
   414/703; 414/917; 414/920; 414/24.5; 414/607
[58] Field of Search ....................... 414/24.5, 607, 685,
   414/703, 910, 911, 917, 920; 294/61

[56] References Cited

U.S. PATENT DOCUMENTS

| | | |
|---|---|---|
| 2,517,582 | 8/1950 | Lull . |
| 2,668,631 | 2/1954 | Reese . |
| 2,690,849 | 10/1954 | Andersen . |
| 3,058,845 | 7/1962 | Hackett . |
| 3,700,123 | 10/1972 | Corley, Jr. ................. 414/917 X |
| 3,966,064 | 6/1976 | Felburn . |
| 4,325,666 | 4/1982 | Chain et al. ............... 414/24.5 |

FOREIGN PATENT DOCUMENTS

| | | | |
|---|---|---|---|
| 1264024 | 5/1961 | France ............................ 414/703 |
| 403506 | 6/1966 | Switzerland .................... 414/703 |

*Primary Examiner*—Robert J. Spar
*Assistant Examiner*—Donald W. Underwood
*Attorney, Agent, or Firm*—Leon Gilden

[57] ABSTRACT

A hay bale elevator apparatus is set forth wherein a forward rectangular framework has orthogonally projecting exteriorly of a lower frame member thereof a plurality of cradling rods for accepting a hay bale thereon wherein a rear rectangular framework of equal dimensional configuration to said forward framework is pivotally secured to said forward framework by four parallel links pivotally secured at each of their ends to the respective forward and rear framework. A lower frame member of the rear framework has secured a plurality of pivot points integrally thereto with a single pivot point oriented medially of an upper frame member of said rear framework for attachment to a three-point hitch of a farm tractor. A hydraulic extensible and retractable cylinder is secured to the lower frame member of said rear framework with a telescoping piston directed outwardly from said cylinder and secured rearwardly of an upper member of said forward framework for lifting said forward framework relative to said rear framework and the associated rods to elevate an associated hay bale cradled on said rods from a first position wherein said rods are generally aligned with lower pivot links to a second position wherein said rods are at an obtuse angle to said lower pivot links.

7 Claims, 5 Drawing Sheets

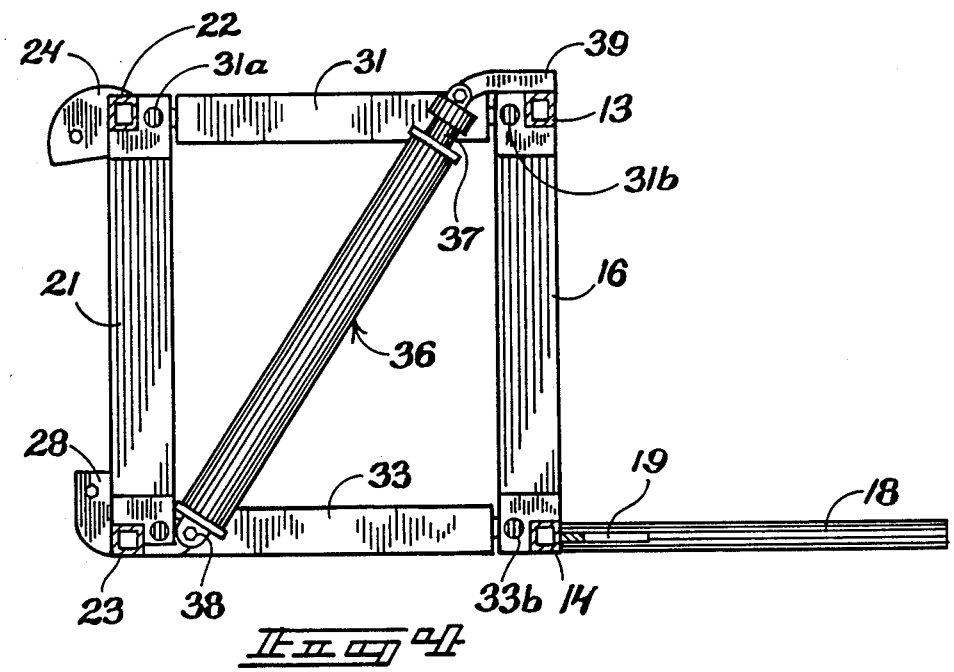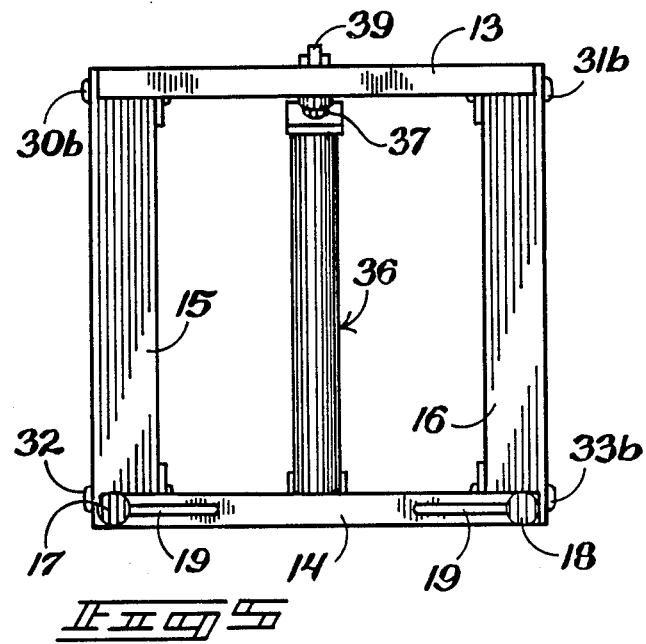

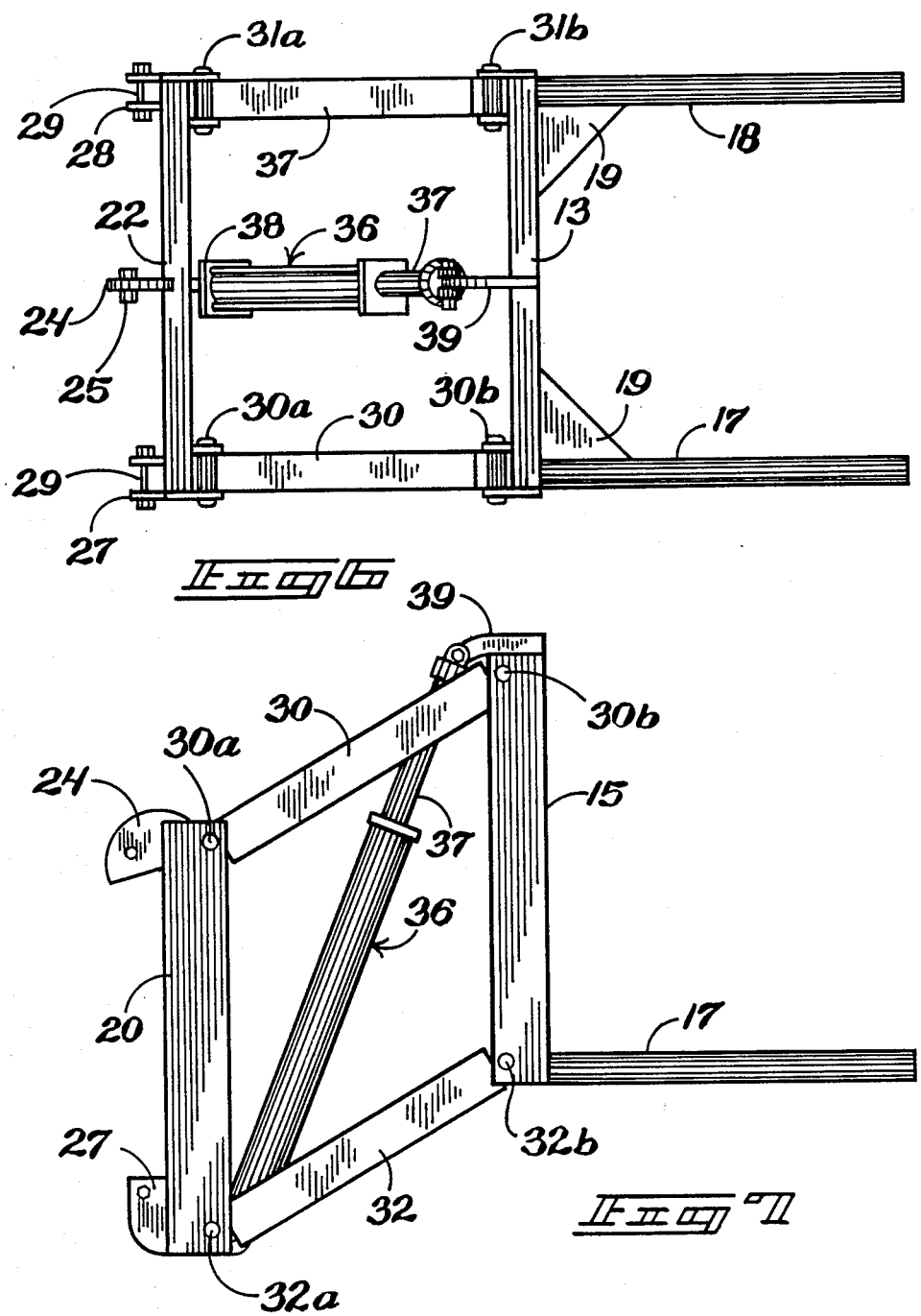

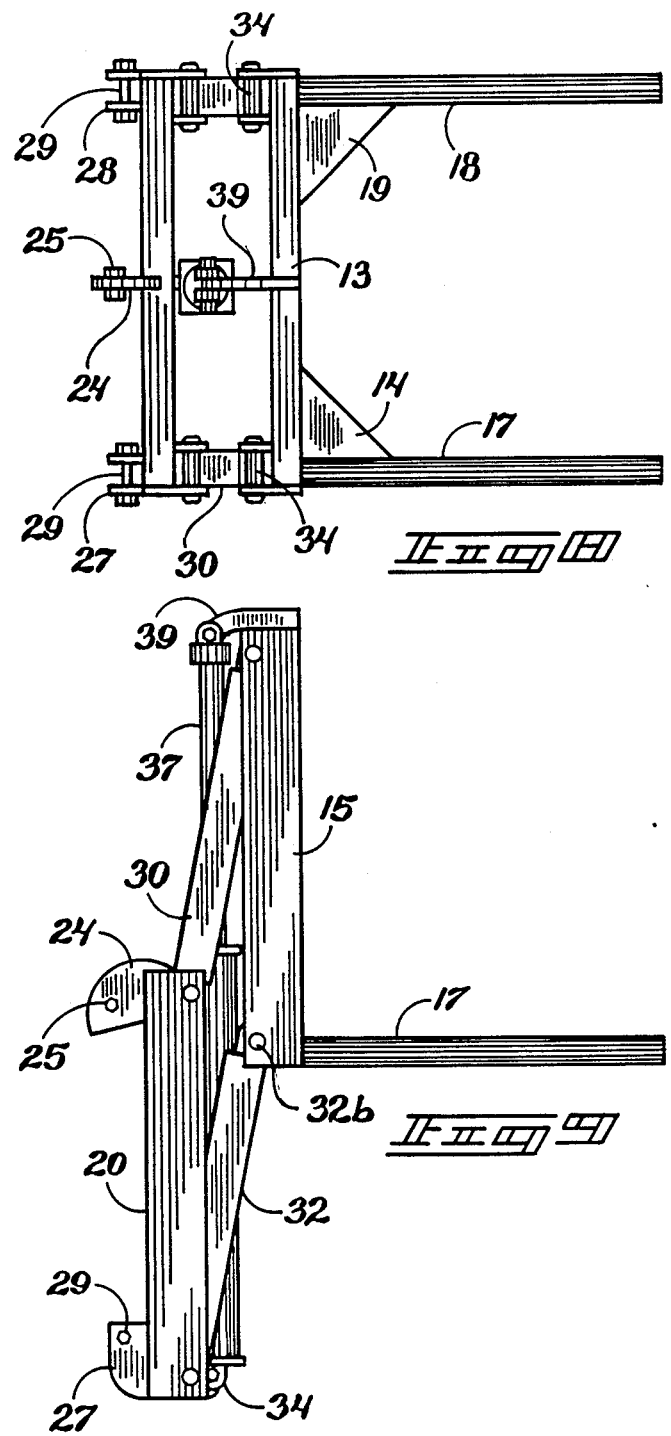

HAY BALE ELEVATOR APPARATUS

BACKGROUND OF THE INVENTION

1. Field of the Invention

The field of invention is related to hay bale manipulating apparatus, and more particularly pertains to a hay bale elevator apparatus which is utilized to cradle and lift a hay bale from a first ground level to an elevated level without piercing and damaging said hay bale.

2. Description of the Prior Art

The use of hay bale manipulating apparatus has become conventional in the prior art requiring the manipulating of larger and larger bales of hay that are produced as a consequence of contemporary harvesting techniques. Prior art devices have frequently pierced such bales to lift and manipulate the same wherein the hay bales are thereby subject to intrusion by insect and moisture with resultant damage to the bales. Alternative means for lifting bales have tended to utilize all-purpose machinery not intended specifically for such purpose and use with results consistent with the application of machinery ill designed for a specific purpose. Examples of such all-purpose machinery utilized may found in U.S. Pat. No. 2,517,582 to Lull wherein a conventional hydraulically manipulated bucket secured to a conventional tractor by elaborate framework is oriented forwardly of the tractor for the lifting and lowering of said bucket. The Lull patent, while a functioning and useful solution in the manipulation of a bucket for shoveling and the like, it fails to provide an adequate solution in the manipulation of hay, as does the instant invention.

U.S. Pat. No. 2,668,631 to Reese sets forth a further example of a hydraulic bucket securable forwardly of an associated tractor in a manner similar to that of Lull including additional linkages for additional manipulation of the bucket. As in the Lull patent, the Reese patent is of limited applicability and efficiency in manipulating hay bales in a safe fashion, as does the instant invention.

U.S. Pat. No. 2,690,849 to Andersen illustrates a still further example of a loading and digging bucket arrangement provided with complex linkages for the positioning of the associated bucket at various positions relative to the associated tractor, but as in other prior art, is of limited applicability to a specialized problem, as in the instant invention.

U.S. Pat. No. 3,045,845 to Hackett is merely a further example of a complex digging implement employing a multiple of complex controls and the like ill suited for the rigorous and simplified needs of a hay baler elevator, as in the instant invention.

U.S. Pat. No. 3,966,064 to Felburn sets forth an elevator apparatus for use in the lifting of road vehicles as a tow truck is provided with an "L" shaped lift platform pivotal rearwardly of an associated tow truck-type vehicle.

As such, it may be appreciated that there continues to exist a need for a new and improved hay bale elevator apparatus which addresses the problems of effectiveness and simplicity and in this respect, the present invention substantially fulfills this need.

SUMMARY OF THE INVENTION

In view of the foregoing disadvantages inherent in the known types of elevator apparatus now present in the prior art, the present invention provides an hay bale elevator apparatus wherein the same may be compactly and conveniently secured to a conventional tractor utilizing a three-point hitch and may be further manipulated by an included hydraulic ram to elevate associate over-size hay bales onto transport apparatus and the like. As such, the general purpose of the present invention, which will be described subsequently in greater detail, is to provide a new and improved hay bale elevator apparatus which has all the advantages of the prior art elevator apparatus and none of the disadvantages.

To attain this, the present invention utilizes parallel spaced equally dimensioned forward and rear frameworks pivotally linked together by parallel equally spaced links associating the four respective corners of the forward and rear frameworks wherein the forward framework is provided with a pair of parallel cradle rods for supportingly engaging in a non-damaging manner an associated hay bale for elevation by means of an extensible and retractable hydraulic ram associating the forward and rear frameworks.

My invention resides not in any one of these features per se, but rather in the particular combinations of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hay bale elevator apparatus which has all the advantages of the prior art hay bale elevator apparatus and none of the disadvantages.

It is another object of the present invention to provide a new and improved hay bale elevator apparatus which may be easily and efficiently manufactured and marketed.

It is a further object of the present invention to provide a new and improved hay bale elevator apparatus which is of a durable and reliable construction.

An even further object of the present invention is to provide a new and improved hay bale elevator apparatus which is susceptible of a low cost of manufacture with regard to both materials and labor, and which accordingly is then susceptible of low prices of sale to the consuming public, thereby making such hay bale elevator apparatus economically available to the buying public.

Still yet another object of the present invention is to provide a new and improved hay bale elevator apparatus which provides in the apparatuses and methods of the prior art some of the advantages thereof, while simultaneously overcoming some of the disadvantages normally associated therewith.

Still another object of the present invention is to provide a new and improved hay bale elevator apparatus for supporting and lifting large hay bales in a non-damaging manner for elevation to transport and storage facilities.

Yet another object of the present invention is to provide a new and improved hay bale elevator apparatus wherein the same may be compactly and efficiently secured to a conventional three-point hitch of an associated farm tractor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic view taken along the lines 4—4 of FIG. 2.

FIG. 5 is an orthographic front view of the instant invention taken in elevation.

FIG. 6 is a top orthographic view of the instant invention in a partially elevated configuration.

FIG. 7 is an orthographic side view taken in elevation of the invention in a partially elevated configuration.

FIG. 8 is a top orthographic view of the instant invention in a fully elevated orientation.

FIG. 9 is a side orthographic view taken in elevation of the instant invention in a fully elevated orientation.

DESCRIPTION OF THE PREFERRED EMBODIMENT

Figure 1:
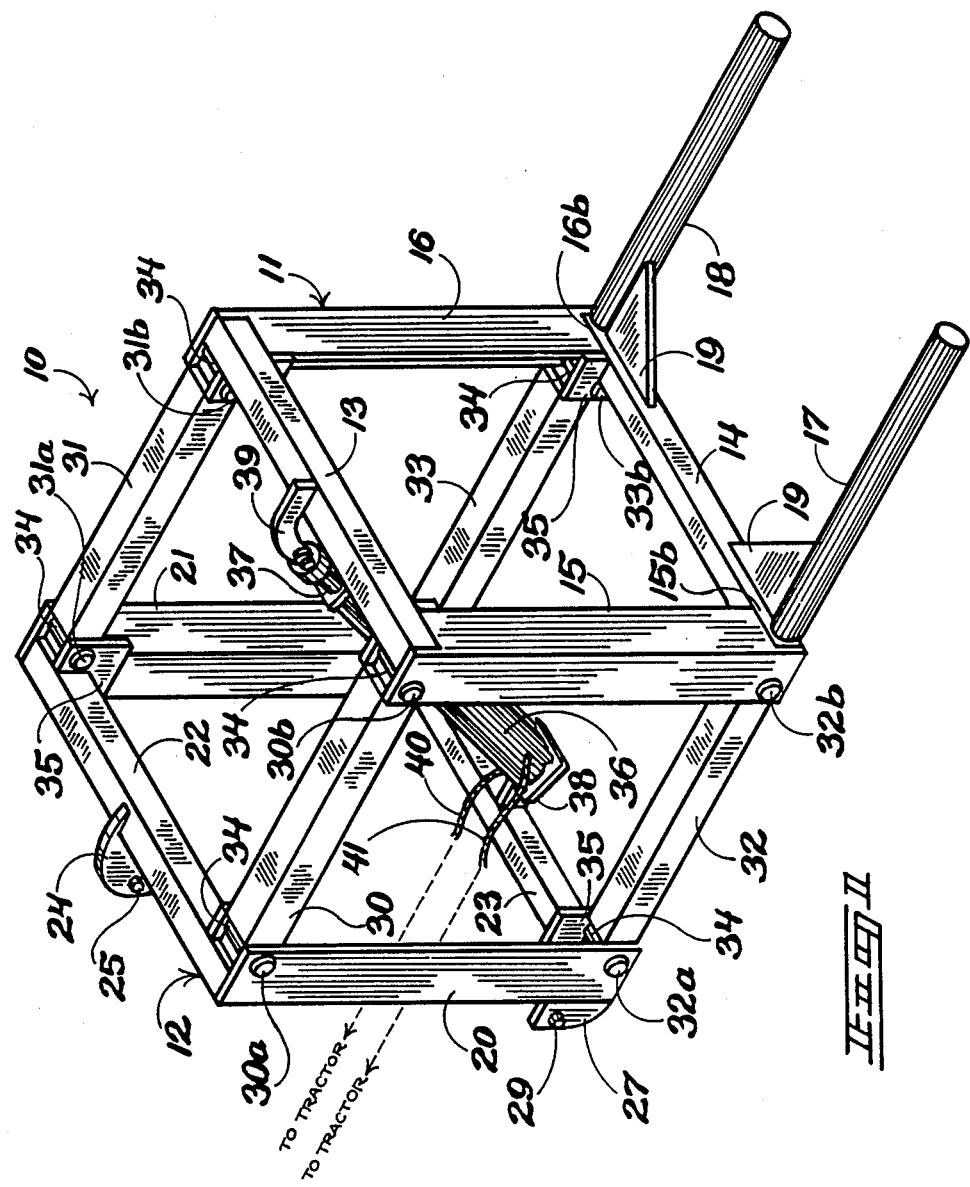
FIG. 1 is an isometric illustration of the instant invention.

With reference now to the drawings, and in particular to FIGS. 1 to 9 thereof, a new and improved hay bale elevator apparatus embodying the principles and concepts of the present invention and generally designated by the reference numeral 10 will be described.

More specifically, it will be noted that the hay bale elevator apparatus 10 includes a forward rectangular framework 11 oriented in a parallel forwardly spaced relationship to a rear rectangular framework 12 that is secured to a conventional tractor utilizing a typical three-point hitch. The forward framework 11 is oriented in a first position, as illustrated in FIGS. 1 through 5, whereupon by application of hydraulic fluid pressure to an included hydraulic cylinder 36, the forward framework 11 is vertically elevated as illustrated in FIGS. 6 through 9 to a final second position, as illustrated in FIGS. 8 and 9, supportingly carrying an associated hay bale, not illustrated, on the right and left cradle rods of 17 and 18. The forward framework 11 essentially comprises a forward top member 13 of finite length parallel to and aligned with a forward lower member 14. Each respective member 13 and 14 is orthogonally and integrally secured at respective terminal ends between parallel forward right side member 15 and forward left side member 16, each of a generally "L" shaped configuration. The forward right side member 15 has formed therein at terminal upper and lower ends thereof respective upper and lower receiving notches 15a and b with the left side member 16 formed with respective upper and lower receiving notches 16a and b for accepting the respective forward top and lowere members 13 and 14 respectively nestingly within said notches. An exterior surface of the lower forward member 14 has formed at proximate ends thereof the pointed right and left cradle rods 17 and 18 formed with a triangular gusset 19 within the corners formed by the union of the cradles 17 and 18 and the lower member 14. The right and left cradle rod 17 and 18 are of a generally cylindrical nature to minimize damage to an associated hay bale during manipulation of said bale.

The rear rectangular framework 12 is formed of rear right member 20 parallel to a mirror image rear left member 21 formed with notches in a like manner, as formed in the right and left members 15 and 16 of the forward framework 11. Accordingly, a rear upper member and rear lower member are secured within the respective right and left members 20 and 21 within the aforenoted notches to form a rear framework of equal dimension to the forward framework 11.

Integrally formed to an exterior surface of the rear upper member 22 and medially of the length of a member 22 is a top pivot connection 24 formed with a threaded connector therethrough 25 for securement of a top connector of a conventional three-point hitch of a tractor of well known construction. Further, formed to the rear lower member 23 at its outer face and orthogonally oriented to the respective right and left members 20 and 21 is a respective lower right bifurcated yoke 27 and lower left bifurcated yoke 28 secured orthogonally to the respective members 20 and 21. Formed through the right and left yokes 27 and 28 is a threaded rod fastener 29 to connect the remaining two connector points of the aforenoted three-point hitch.

Figure 2:
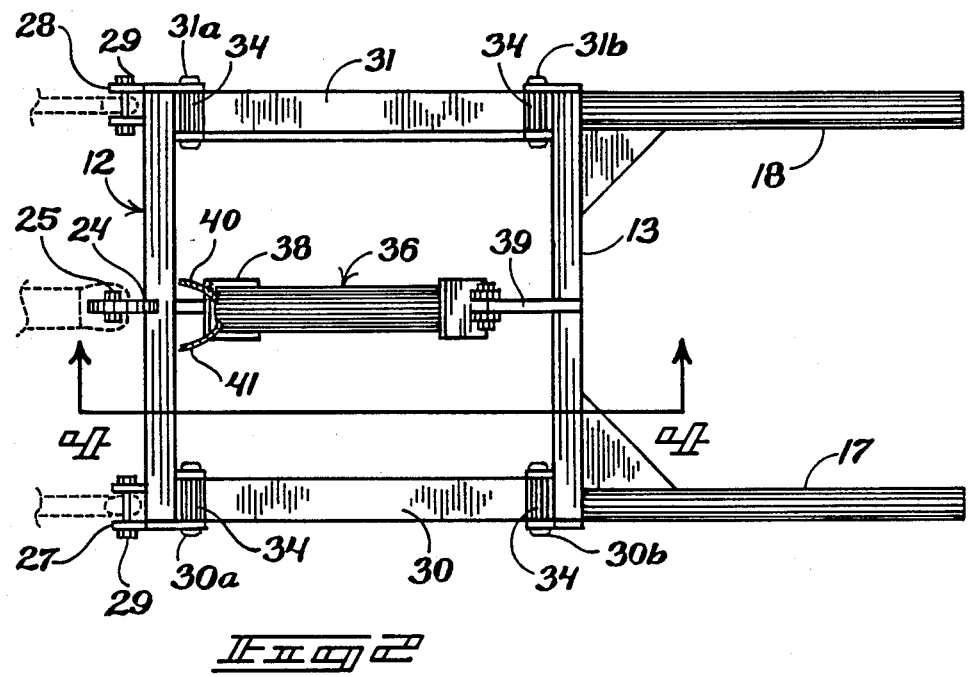
FIG. 2 is a top orthographic view of the instant invention.
Figure 3:
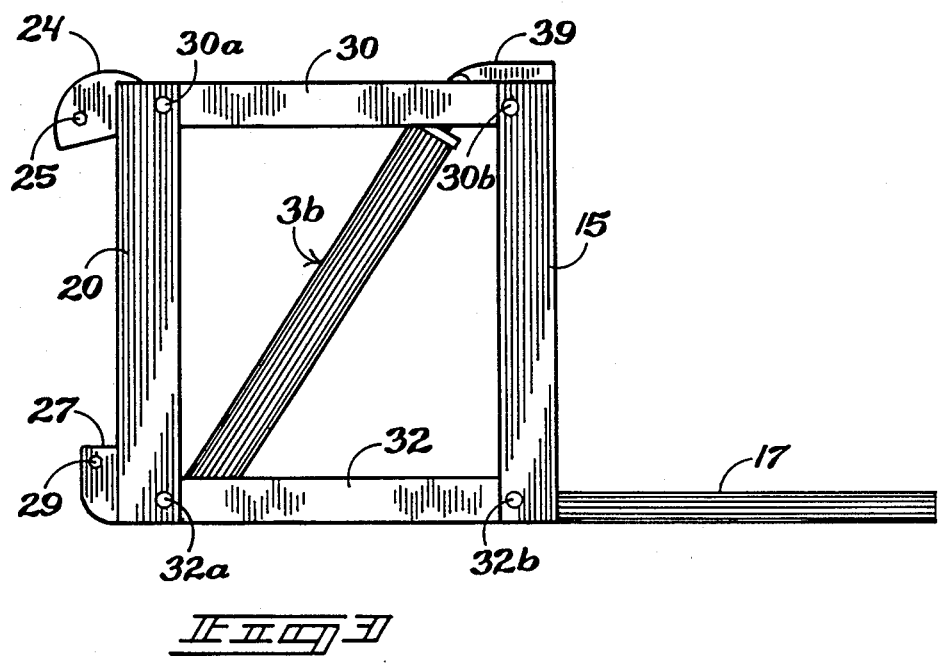
FIG. 3 is a side orthographic view taken in elevation of the instant invention.

As the apex of each of the side "L" shaped members 15, 16, 20, and 21 are outwardly directed of the elevator apparatus 10, pivot links comprising right upper pivot link 30, left upper pivot link 31, right lower pivot link 32, and left lower pivot link 33 are accordingly pivotally securable between pairs of the side members. Furthermore, an interior flange 35 is integrally formed, as by welding, to an interior surface of a respective side member at each upper and terminal end thereof to form bifurcated yokes wherein respective arcuate knuckles 34 that are secured to each terminal end of the respective pivot links may thereby rotate within the aforenoted yokes secured therein by respective pivot rods set forth as rear and forward pivot rods 30a and 30b associated with the pivot link 30, rear and forward left pivot rods 31a and b associated with left upper pivot link 31, pivot rods 32a and b rotatably associated with respective right lower pivot link 32, and pivot rods 33a and b rotatably associated with the left lower pivot link 33. As each pivot link is of equal length, the elevator apparatus maintains the forward rectangular framework 11 parallel to the rear rectangular framework 12 during use, as illustrated in the sequential operation of the framework in FIGS. 2 and 3 illustrating the first position, FIGS. 6 and 7 illustrating a medial position in elevation, and finally FIGS. 8 and 9 illustrating a full upward elevation of the apparatus 10.

Providing the mechanical movement to the associated frameworks is a hydraulic cylinder 36 formed with a convention extensible and retractable cylinder rod 37 wherein the cylinder base 38 is pivotally joined to the rear lower member 23, as illustrated in FIG. 4 for example, with the upper terminal end of the cylinder rod 37 pivotally secured to a crescent plate 39. The crescent plate 39 is integrally secured, as by welding, to an upper surface of the forward top member 13 to provide a maximum degree of elevation and lift to the forward framework 11 and associated cradle rods 17 and 18. Conventionally fluid lines depicted as a first fluid line 40 and a second fluid line 41 for association with the aforenoted tractor or to an independent pump (not illustrated) is utilized to provide a desired flow of hydraulic fluid under pressure to the hydraulic cylinder 36.

In use, the cradle rods 17 and 18 are positioned under an associated hay bale, such as the contemporary round large bales, as utilized in modern farming and through the aforenoted mechanisms of the forward and rear frameworks and associated links and hydraulic motor power supply therebetween, and associated bale resting the rods 17 and 18 may be lifted to a desired orientation, as illustrated in FIG. 9 for example, to a desired transport vehicle or hay bale manipulating apparatus such as a stacker, etc.

The manner of usage and operation of the instant invention therefore from the above description should be apparent and accordingly no further discussion as to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hay bale elevator apparatus for use in combination with a farm tractor for lifting hay bales, said apparatus comprising, a forward framework means mounted for parallel movement to a rear framework means;

said forward framework means including a first cradle means and a second cradle means operably associated together for supportingly carrying a hay bale thereon, and power means coupled to said rear framework means and said forward framework means for lifting said forward framework means relative to said rear framework means to said tractor, and wherein said forward framework means further includes an "L" shaped right side member and a parallel "L" shaped left side member with a top member integrally secured within notches formed proximate upper terminal side of said respective right and left side members with a lower member integrally secured within notches formed within lower terminal ends of said right and left side members, and wherein said first and second cradle means are orthogonally and integrally secured to said lower member projecting outwardly of said forward framework means.

2. A hay bale elevator apparatus as set forth in claim 1 wherein said first and second cradle means are cylindrical rods secured to proximate terminal ends of said lower member.

3. A hay bale elevator apparatus as set forth in claim 2 wherein said rear framework means includes an "L" shaped rear right member and an "L" shaped rear left member oriented and secured parallel to each other with a rear upper member secured within notches formed in upper terminal ends of said rear right and left members, and a rear lower member secured within lower notches formed in lower terminal ends of said rear right and left members wherein said upper and lower members are arranged parallel to each other, and a top pivot connection integrally secured to said rear upper member, and a first lower bifurcated yoke integrally secured to a lower terminal surface of said rear right member, and a second bifurcated yoke secured to a lower terminal surface of said rear left member, and said first and second bifurcated are aligned with each other and said rear lower member, wherein said top pivot connection and said first and second bifurcated yokes comprises said mounting means.

4. A hay bale elevator apparatus as set forth in claim 3 wherein a first pivot link pivotally secures upper terminal ends of said rear right member and said right side member together, and a second pivot link pivotally secured upper terminal ends of said rear left member and said left side member, and a third pivot link pivotally secures lower terminal ends of said rear right member and said right side member together, and a fourth pivot link pivotally secures lower terminal ends of said rear left member and said left side member together, and said first, second and third pivot links are arranged parallel to each other.

5. A hay bale elevator apparatus as set forth in claim 4 wherein said forward framework means is mounted with parallel movement to said rear frame means from a first position wherein said first and second cradle means are aligned with said third and fourth links respectively, and said framework means is further movable to a second position upon actuation of said power means wherein said first and second cradle means are elevated proximate upper terminal ends of said rear right and left members.

6. A hay bale elevator apparatus as set forth in claim 5 wherein said power means includes a hydraulic cylinder pivotally secured to said rear lower member wherein said cylinder means has reciprocatably secured therein a cylinder rod pivotally secured to an upper surface of said forward member.

7. A hay bale elevator apparatus as set forth in claim 6 wherein a crescent plate is integrally secured to an upper surface of said forward member to provide pivotal securement of said cylinder rod to said forward member and said crescent plate enables said hydraulic cylinder to maximize elevation of said forward framework member relative to said rear framework member.

* * * * *